United States Patent
Descheemaeker et al.

(10) Patent No.: US 10,235,777 B2
(45) Date of Patent: Mar. 19, 2019

(54) DISPLAY SYSTEM AND METHOD FOR AN AIRCRAFT

(71) Applicant: Airbus Operations SAS, Toulouse (FR)

(72) Inventors: Cedric Descheemaeker, Beauzelle (FR); Javier Manjon Sanchez, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 15/616,614

(22) Filed: Jun. 7, 2017

(65) Prior Publication Data

US 2017/0358108 A1    Dec. 14, 2017

(30) Foreign Application Priority Data

Jun. 13, 2016 (FR) ..................... 16 55438

(51) Int. Cl.
*G06T 11/00* (2006.01)
*B64D 43/02* (2006.01)
(Continued)

(52) U.S. Cl.
CPC .............. *G06T 11/00* (2013.01); *B64D 43/02* (2013.01); *G01C 21/16* (2013.01); *G01C 23/00* (2013.01);
(Continued)

(58) Field of Classification Search
CPC ...... G01C 23/00; G06F 3/012; G02B 27/0093
See application file for complete search history.

(56) References Cited

U.S. PATENT DOCUMENTS 5,072,218 A    12/1991  Spero et al.
6,272,404 B1 *  8/2001  Amano ................ G01C 23/005
                                    340/980

(Continued)

FOREIGN PATENT DOCUMENTS

EP      0330147     8/1989
EP      0330184     8/1989
(Continued)

OTHER PUBLICATIONS

French Search Report, dated May 17, 2017, priority document.

*Primary Examiner* — Ryan R Yang
(74) *Attorney, Agent, or Firm* — Greer, Burns & Crain, Ltd.

(57) ABSTRACT

A display system for an aircraft cockpit comprises a display device configured to be secured to a user's head, a sensor to determine an orientation of the user's head, and a display computer. The computer is configured to control the display of information relating to the flight of the aircraft on the display device, to acquire information on the user's head orientation, to determine an angular offset value between a direction corresponding to the head orientation and a longitudinal axis of the aircraft, to evaluate at least one condition as a function of the angular offset value, and to control the display device display in accordance with a first display mode when the condition is verified, this first display mode corresponding to a display comprising at least one aircraft piloting assistance symbol displayed in a conforming manner, and another display mode when the condition is not verified.

13 Claims, 12 Drawing Sheets

(51) Int. Cl.
*G02B 27/01* (2006.01)
*G06F 3/01* (2006.01)
*G01C 21/16* (2006.01)
*G01C 23/00* (2006.01)
*G02B 27/00* (2006.01)

(52) U.S. Cl.
CPC ..... *G02B 27/0093* (2013.01); *G02B 27/0172* (2013.01); *G06F 3/012* (2013.01); *G02B 2027/014* (2013.01); *G02B 2027/0187* (2013.01)

(56) References Cited

U.S. PATENT DOCUMENTS

| | | | |
|---|---|---|---|
| 8,706,324 B2 * | 4/2014 | Barral | G01D 7/00 340/945 |
| 8,825,238 B2 * | 9/2014 | Peptione | G05D 1/0676 340/963 |
| 9,244,281 B1 | 1/2016 | Zimmerman et al. | |
| 9,776,734 B2 * | 10/2017 | Eberle | B64D 45/08 |
| 2005/0237226 A1 * | 10/2005 | Judge | G01C 23/00 340/946 |
| 2010/0117867 A1 | 5/2010 | He | |
| 2010/0286850 A1 * | 11/2010 | Collot | G01C 23/00 701/7 |
| 2016/0376026 A1 * | 12/2016 | Baudson | B64D 43/00 345/7 |
| 2017/0053453 A1 | 2/2017 | Andre et al. | |

FOREIGN PATENT DOCUMENTS

| | | |
|---|---|---|
| EP | 2194361 | 6/2010 |
| WO | 2015128212 | 9/2015 |
| WO | 2015165838 | 11/2015 |

* cited by examiner

DISPLAY SYSTEM AND METHOD FOR AN AIRCRAFT

CROSS-REFERENCES TO RELATED APPLICATIONS

This application claims the benefit of the French patent application No. 1655438 filed on Jun. 13, 2016, the entire disclosures of which are incorporated herein by way of reference.

BACKGROUND OF THE INVENTION

The invention relates to the display of piloting assistance information in the cockpit of an aircraft. Modern aircraft, in particular transport aircraft, generally include a system for display of piloting assistance information in their cockpit. A system of this kind, for example of the CDS (Control and Display System) type, controls the display of information on screens, termed head-down screens, in the cockpit: to view this information the user, generally a pilot or copilot of the aircraft, must lower their head to look at the screens. They are therefore not able to see, at the same time, the environment of the aircraft through a windshield of the cockpit. To enable the user to see this information at the same time as monitoring the environment of the aircraft, some aircraft are now equipped with a head-up display (HUD) device. An HUD device includes a projector and a semi-reflecting window (known as a "combiner") disposed between the windshield of the aircraft and a position corresponding to the position of the head of a pilot or copilot when the latter is in the cockpit to pilot the aircraft. The projector projects information onto the semi-reflecting window and the user can therefore view this information superimposed on the environment of the aircraft visible through the windshield. Some information can be displayed in a conforming manner. In the remainder of the description, the expression in a conforming manner refers to the display of information or a symbol on a display or a transparent screen in such a way that this information or this symbol can be seen by the user superimposed on the external environment of the aircraft, at a position conforming to the meaning of the information or symbol. For example, when it is displayed in a conforming manner, a symbol representing a runway is displayed superimposed on the position of the real runway that the user can see through the windshield of the aircraft. An HUD device of this kind is generally of high cost. Moreover, installing it in an aircraft can be complicated and costly, especially if such installation was not planned during the design of the aircraft. Moreover, the HUD device is not visible to the user, or only partly visible, if the user is called upon to turn their head to monitor the lateral environment of the aircraft: the information displayed on the HUD is then not visible, or only partly visible, to the user.

SUMMARY OF THE INVENTION

The inventors of the present invention have envisaged a solution to these problems that could comprise using a display device configured to be secured the head of a user, in particular a pilot, in the cockpit of an aircraft. A device of this kind is commonly termed an HMD (head-mounted display). It is sometimes also termed an HWD (head-worn display). It generally includes a display mounted on and fastened to goggles or a helmet so that the user can see information displayed on the display when wearing the goggles or the helmet. In the remainder of the description, the term HMD refers equally to an HMD device and an HWD device. HMD devices including a helmet are used in military aircraft to assist operations in firing on a target, for example. HMD devices including goggles are used for displays in augmented reality, for example. The display is preferably transparent so that the user can view the augmented reality information displayed superimposed on the environment. A solution of this kind can be acceptable only if the display of the information on the HMD device is controlled appropriately as a function of the orientation of the head of the user. Thus, for example, the information cannot be displayed on the HMD device in the same manner regardless of the orientation of the head of the pilot, because in this case some information would risk not being displayed in a manner consistent with the external environment of the aircraft seen by the user. This would be the case, in particular, with information intended to be displayed in a manner conforming with the environment. On the other hand, there would be no benefit in displaying this information in such a manner that it appears to be displayed in a fixed manner in the cockpit when the user turns their head (in the same manner as for the information displayed on an HUD): in fact, in such a case, the user would be confronted with the same problem as with an HUD device, namely that the information would not be visible to the user, or only partly visible, if the user were to be called upon to turn their head to monitor the lateral environment of the aircraft.

One particular object of the present invention is to provide a solution to the above problem. The present invention concerns:

- a display device configured to be secured the head of a user in the cockpit of the aircraft;
- a sensor for the orientation of the head of the user of the display device; and
- a display computer configured to control the display of information relating to the flight of the aircraft on the display device.

The system is remarkable in that the display computer is configured:

- to acquire information on the orientation of the head of the user supplied by the sensor;
- to determine at least one angular offset value between on the one hand a direction corresponding to the information on the orientation of the head of the user and on the other hand a longitudinal axis of the aircraft;
- to evaluate at least one condition as a function at least of the angular offset value; and
- to control the display on the display device in accordance with:
  - a first display mode when the condition is verified, this first display mode corresponding to a display comprising at least one aircraft piloting assistance symbol displayed in a conforming manner; and
  - another display mode when the condition is not verified.

The display system therefore adapts the mode of displaying the information as a function of the value of the angular offset between the direction corresponding to the information on the orientation of the head of the user and the longitudinal axis of the aircraft. This makes it possible to display information for the user in an appropriate manner depending on the orientation of the head of the user, in particular where the at least one symbol displayed in a conforming manner in the first display mode is concerned.

The at least one piloting assistance symbol is advantageously chosen from the following symbols:

- an aircraft speed vector symbol; and
- an aircraft reference symbol.

The first display mode advantageously corresponds to a display similar to that of an HUD.

In a first embodiment, the angular offset value comprises a lateral angular offset and the condition includes at least one first elementary condition that is verified when the lateral angular offset is between a predetermined negative lateral angular offset threshold and a predetermined positive lateral angular offset threshold inclusive. In particular, the condition further includes a second elementary condition that is verified when the value of a second lateral angular offset between on the one hand the direction corresponding to the orientation of the head of the user and on the other hand the aircraft speed vector is between a second negative predetermined lateral angular offset threshold and a second positive predetermined lateral angular offset threshold inclusive.

The other display mode advantageously corresponds to a second display mode in which the at least one aircraft piloting assistance symbol is displayed in a non-conforming manner. In particular, the at least one symbol is an aircraft speed vector symbol and the display further comprises a symbol representing a horizon line, the aircraft speed vector symbol and the symbol representing the horizon line being displayed relative to each other so as to indicate a climbing movement or a descending movement of the aircraft.

The at least one aircraft piloting assistance symbol is advantageously also displayed in a non-conforming manner at a position characteristic of a direction toward which the user can orient their head to obtain a conforming display of the at least one symbol in the first display mode.

In particular, in the second display mode, the display further comprises a symbol representing the roll of the aircraft shown in association with the at least one symbol.

In particular, in the second display mode, the display also includes a reduced number of information items relative to the display corresponding to the first display mode.

In a second embodiment, the angular offset value comprises a vertical angular offset and the condition includes at least one elementary condition that is verified when the vertical angular offset is between a predetermined negative vertical angular offset threshold and a predetermined positive vertical angular offset threshold inclusive. In particular, the other display mode corresponds to a third display mode in which the display corresponding to the first display mode is at least partially masked.

In one particular embodiment, in the first display mode, the display comprises at least part of an attitude scale and, if necessary, this attitude scale is expanded laterally as a function of the orientation of the head of the user in order to enable the display of the at least part of the attitude scale.

In another particular embodiment, in the first display mode, the display further comprises a speed scale and/or an altitude scale and the display computer controls the display on the display device so that the speed scale and/or the altitude scale are displayed vertically in a frame of reference tied to the aircraft.

The invention also relates to a method of display in a cockpit of an aircraft, the aircraft including a display system comprising:
 a display device configured to be secured the head of a user in the cockpit of the aircraft;
 a sensor for the orientation of the head of a user of the display device; and
 a display computer configured to control the display of information relating to the flight of the aircraft on the display device.

The method is remarkable in that it includes the following steps executed by the display computer:

acquiring information on the orientation of the head of the user supplied by the sensor;
determining at least one angular offset value between on the one hand a direction corresponding to the information on the orientation of the head of the user and on the other hand a longitudinal axis of the aircraft;
evaluating at least one condition as a function at least of the angular offset value; and
controlling the display on the display device in accordance with:
 a first display mode when the condition is verified, this first display mode corresponding to a display comprising at least one aircraft piloting assistance symbol displayed in a conforming manner; and
 another display mode when the condition is not verified.

The invention also relates to an aircraft including a display system as referred to above.

BRIEF DESCRIPTION OF THE DRAWINGS

The invention will be better understood on reading the following description and examining the appended figures.

FIGS. 4b, 5b, 6b, 7b, 8b, 9b and 10b show orientations of the head of a user of the HMD device respectively corresponding to the displays of FIGS. 4a, 5a, 6a, 7a, 8a, 9a and 10a.

FIGS. 7c, 7d and 7e show examples of displays similar to the display shown in FIG. 7a.

DETAILED DESCRIPTION OF THE PREFERRED EMBODIMENTS

Figure 1:
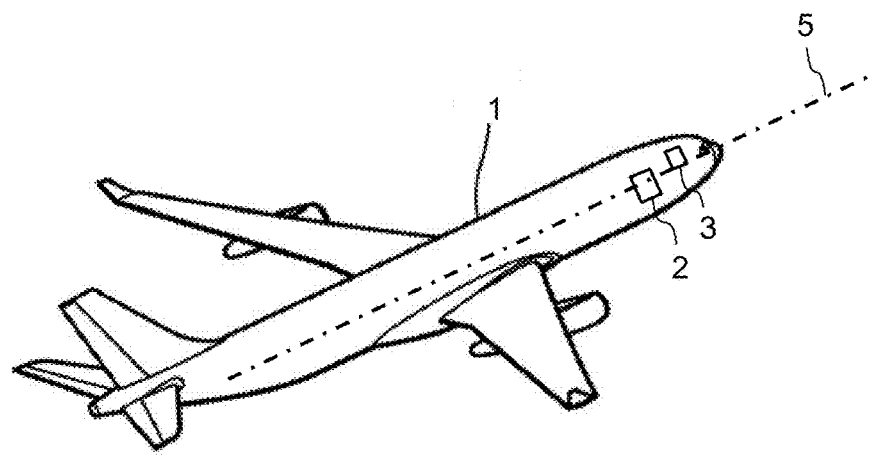
FIG. 1 is a simplified representation of an aircraft including a cockpit.

The aircraft 1 shown in FIG. 1 includes a cockpit 3 in a forward part of the aircraft. It includes a longitudinal axis 5 corresponding to a roll axis of the aircraft. This longitudinal axis is substantially horizontal when the aircraft is parked on the ground. The aircraft also has a yaw axis (not shown) that is substantially vertical when the aircraft is parked on the ground. By convention, in the remainder of the description, the term horizontal designates a line or a plane that is substantially horizontal when the aircraft is parked on the ground such that this line or this plane is perpendicular to the yaw axis of the aircraft. Similarly, the term vertical designates a line or a plane that is substantially vertical when the aircraft is parked on the ground, so that this line or this plane is parallel to (or contains) the yaw axis of the aircraft.

Figure 2:
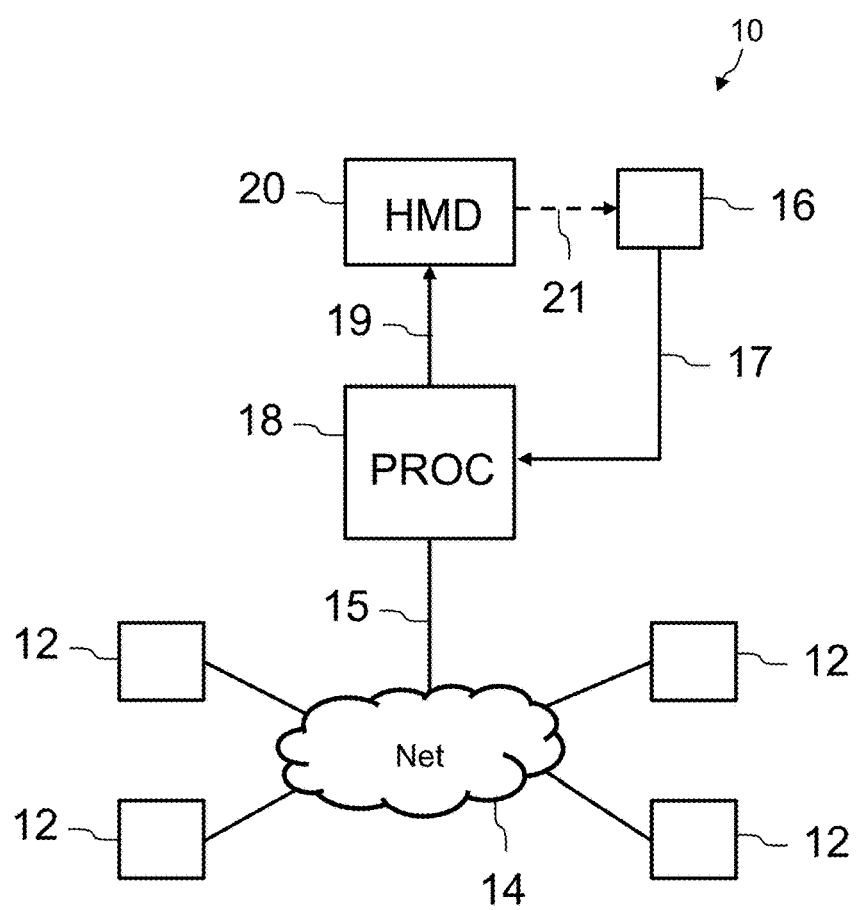
FIG. 2 is a diagram showing a display system for a cockpit of an aircraft conforming to one embodiment of the invention.

The display system 10 shown in FIG. 2 includes a display computer 18 comprising a processor (PROC). This processor can notably comprise a processor or a microprocessor of the display computer. According to various embodiments, the display computer 18 is either a common display computer controlling a plurality of display devices of the aircraft or a computer dedicated to the display system 10. In one particular embodiment, this computer comprises an IMA (Integrated Modular avionics) computer also supporting functions other than the display function. The display system 10 further includes a display device 20 configured to be secured the head of a user in the cockpit of the aircraft. This display device comprises an HMD (or HWD) device as indicated above. It is connected to the display computer 18 by a link 19. The display system 10 also includes a sensor 16 of the orientation of the head of a user of the display device, in particular of a pilot of the aircraft. This sensor 16 has its output connected to the display computer 18 via a link 17. In one particular embodiment, the sensor 16 is secured to the display device 20, as symbolically represented by the dashed line arrow 21. For example, it then comprises a set of inertial sensors integrated into the display device 20. In another particular embodiment, the sensor 16 is secured in the cockpit 3 of the aircraft. For example, it then comprises a video camera disposed so as to monitor automatically the head of a user of the display device 20. The display computer 18 is connected to at least one avionic computer 12 of the aircraft. In the particular example shown in FIG. 2, the display computer is connected to a plurality of avionic computers 12 via a link 15 of a communication network (Net) 14 to which these avionic computers are also connected. The avionic computers 12 are for example situated in an avionics bay 2 of the aircraft.

In operation, the display computer 18 is configured to control the display of information relating to the flight of the aircraft on the display device 20. This information relating to the flight of the aircraft either comes from the at least one avionic computer 12 or is determined by the display computer 18 as a function of information received from the at least one avionic computer 12. The sensor 16 supplies at its output, over the link 17, information on the orientation of the head of the user. This information is received and acquired by the display computer 18.

Figure 3A:
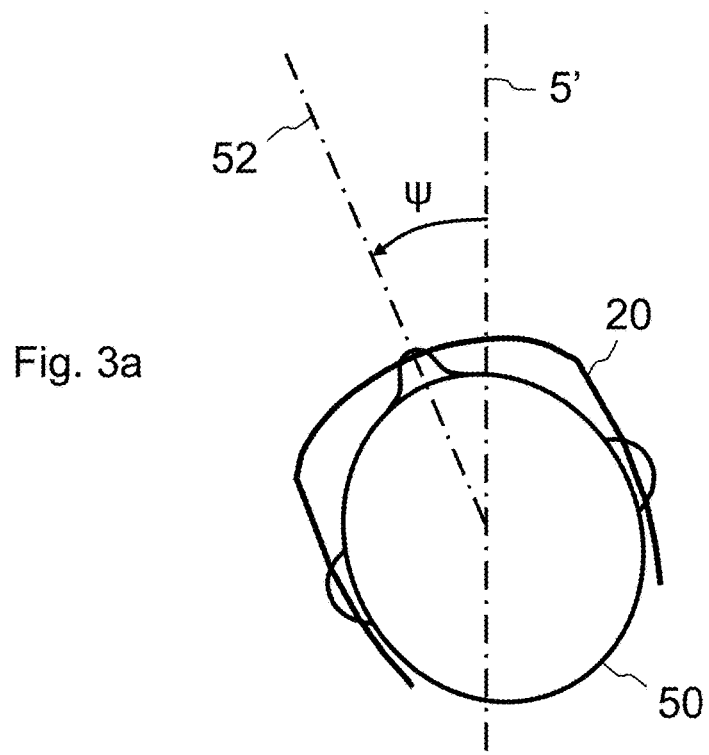
FIGS. 3a, 3b and 3c show the orientation of the head of a user of the display system respectively from above, from the side and from behind.
Figure 3B:
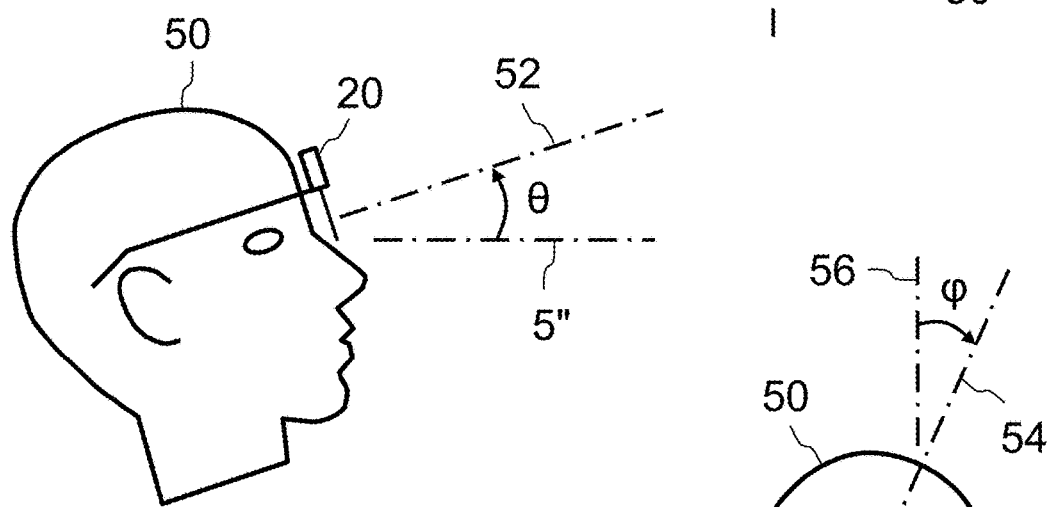
Figure 3C:
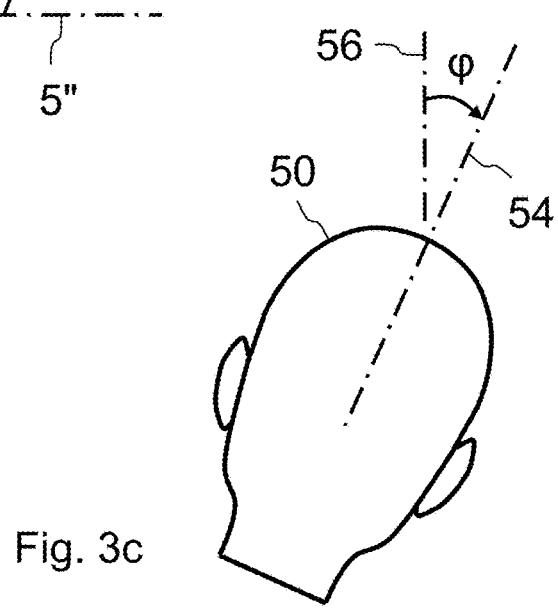

In one advantageous embodiment the information on the orientation of the head of the user corresponds to at least one angle from a set of angles, as shown in FIGS. 3a, 3b and 3c. In those figures, the orientation of the head 50 of the user is represented by a line 52. In one embodiment, this line 52 corresponds to a theoretical direction in which the user is looking, when looking to the front without turning their eyes either to the right or to the left and without looking up or looking down. Other definitions of the orientation of the head of the user are nevertheless possible without departing from the scope of the invention. In the advantageous embodiment, the information on the orientation of the head of the user comprises at least one of the following angles: a yaw angle $\psi$, a pitch angle $\theta$ and a roll angle $\varphi$ shown in FIGS. 3a, 3b and 3c, respectively. These angles are defined in a frame of reference tied to the aircraft. Accordingly, the yaw angle $\psi$ is an angle defined in projection in a horizontal plane between a line 5' parallel to the longitudinal axis 5 of the aircraft and the line 52 representing the orientation of the head of the user. The pitch angle $\theta$ is an angle, defined in projection in a vertical plane parallel to the longitudinal axis 5 of the aircraft, between a line 5" parallel to the longitudinal axis 5 of the aircraft and the line 52 representing the orientation of the head of the user. For its part, the roll angle $\varphi$ is an angle defined in projection in a vertical plane perpendicular to the longitudinal axis 5 of the aircraft between a vertical line 56 and a yaw axis 54 of the head of the user.

The information on the orientation of the head of the user acquired by the display computer 18 corresponds to at least one of the angles $\psi$, $\theta$ and $\varphi$. As a function of the information on the orientation of the head of the user, the display computer 18 determines at least one angular offset value between on the one hand a direction corresponding to the information on the orientation of the head of the user and on the other hand a longitudinal axis of the aircraft. The display computer 18 evaluates at least one condition as a function of at least the angular offset value and controls the display on the display device 20 in accordance with:

a first display mode when the condition is verified, this first display mode corresponding to a display comprising at least one aircraft piloting assistance symbol displayed in a conforming manner; and another display mode when the condition is not verified.

The at least one aircraft piloting assistance symbol is advantageously chosen from the group comprising:

an aircraft speed vector symbol; and
an aircraft reference symbol.

Figure 4A:
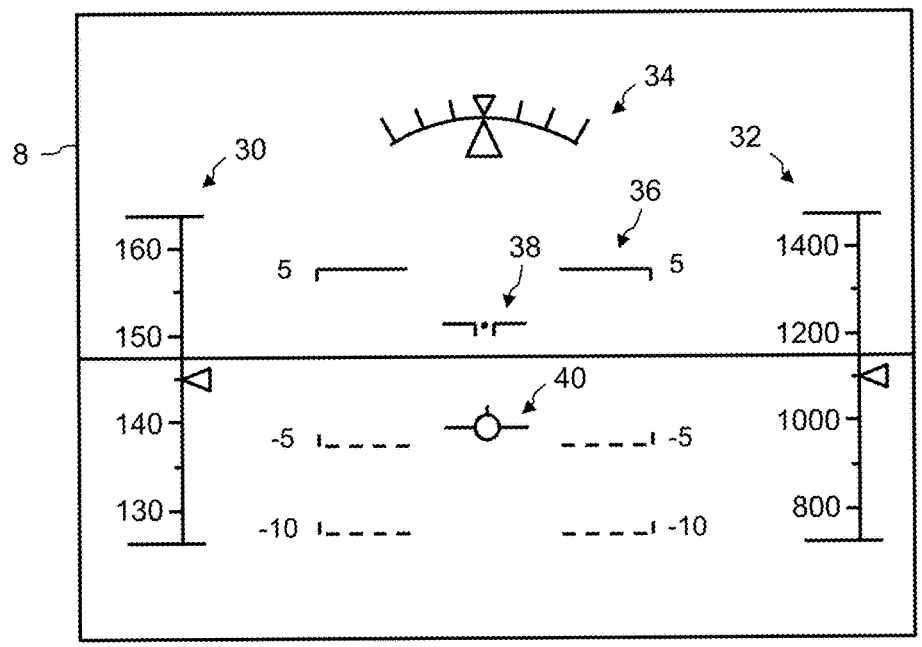
FIGS. 4a, 5a, 6a, 7a, 8a, 9a and 10a show examples of displays on an HMD device conforming to embodiments of the invention.
Figure 4B:
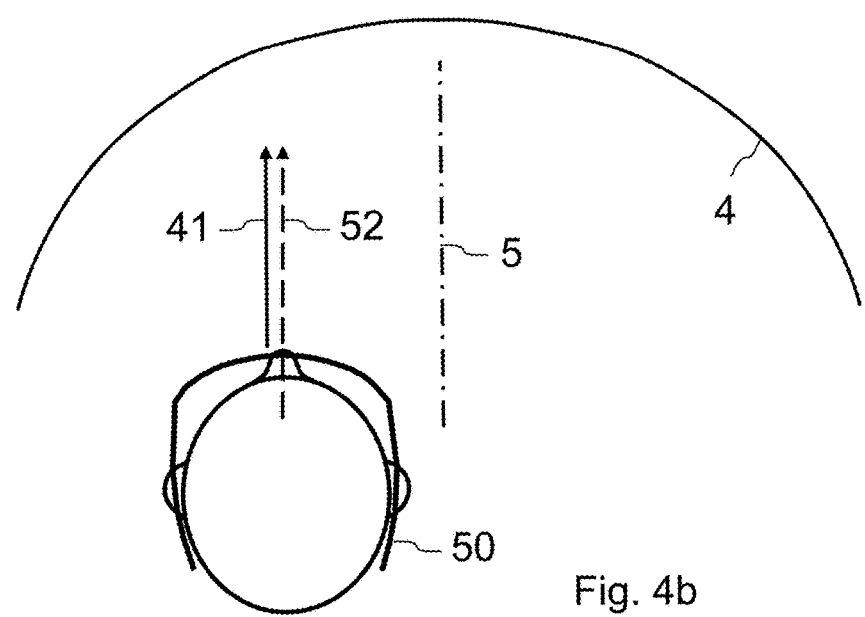

FIG. 4a shows one example of a display on a display unit 8 of the display device 20 comprising these two symbols displayed in a conforming manner. The aircraft reference symbol 38 corresponds to the longitudinal axis 5 of the aircraft. FIG. 4b shows from above the orientation of the head of the user corresponding to the display shown in FIG. 4a in the cockpit of the aircraft including a windshield 4. In this example, in projection in a horizontal plane, the line 52 representing the orientation of the head 50 of the user is parallel to the longitudinal axis 5 of the aircraft. In such a case, the aircraft reference symbol 38 is displayed in a conforming manner at the center of the display, from a lateral (or horizontal) point of view, on the display 8, as shown in FIG. 4a. The vertical position of the symbol 38 depends, in particular, on the value of a pitch angle of the aircraft. In this display example, in projection in a horizontal plane, the speed vector 41 of the aircraft is parallel to the longitudinal axis 5 of the aircraft and to the line 52 representing the orientation of the head 50 of the user. Consequently, the aircraft speed vector symbol 40 is also centered laterally. In the example shown, in addition to the symbols 38 and 40 displayed in a conforming manner, the display on the display unit 8 includes an altitude scale 32, a speed scale 30 and a roll scale 34 for the aircraft. These various scales are displayed on the display unit 8 in a non-conforming manner. They are displayed at respective positions on the display unit 8 independent of the yaw angle and the pitch angle of the head of the user. The display on the display unit 8 further includes an aircraft attitude scale 36 which is displayed in a conforming manner its position on the display unit 8 depends on the pitch angle of the head of the user.

Figure 5A:
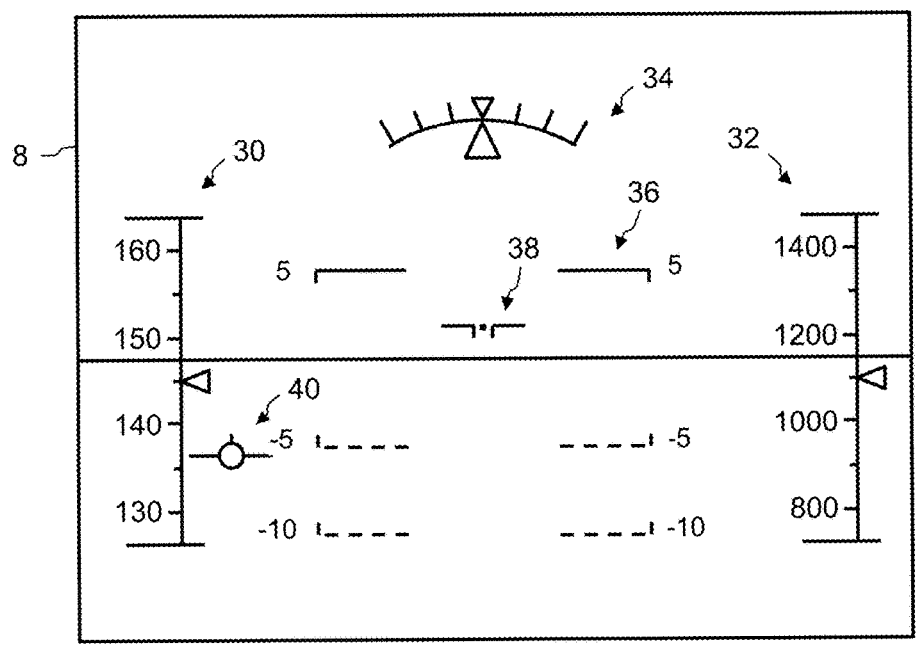
Figure 5B:
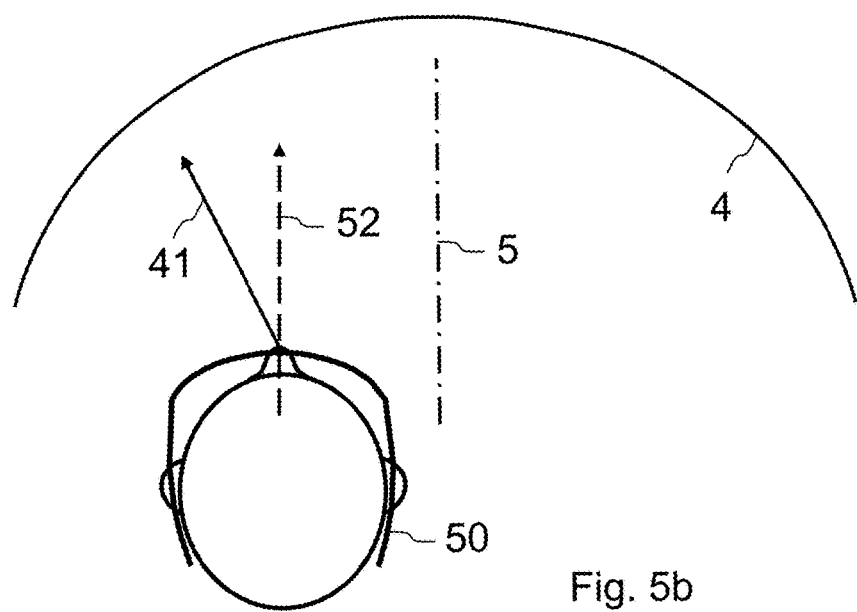

In another example, illustrated by FIGS. 5a and 5b, the speed vector 41 is no longer parallel to the longitudinal axis 5 of the aircraft and to the line 52 representing the orientation of the head 50 of the user. This speed vector 41 is oriented to the front and to the left of the aircraft. Consequently, the speed vector symbol 40 is displayed in a conforming manner at a position offset toward the left (compared to FIG. 4a), near the speed scale 30.

Figure 6A:
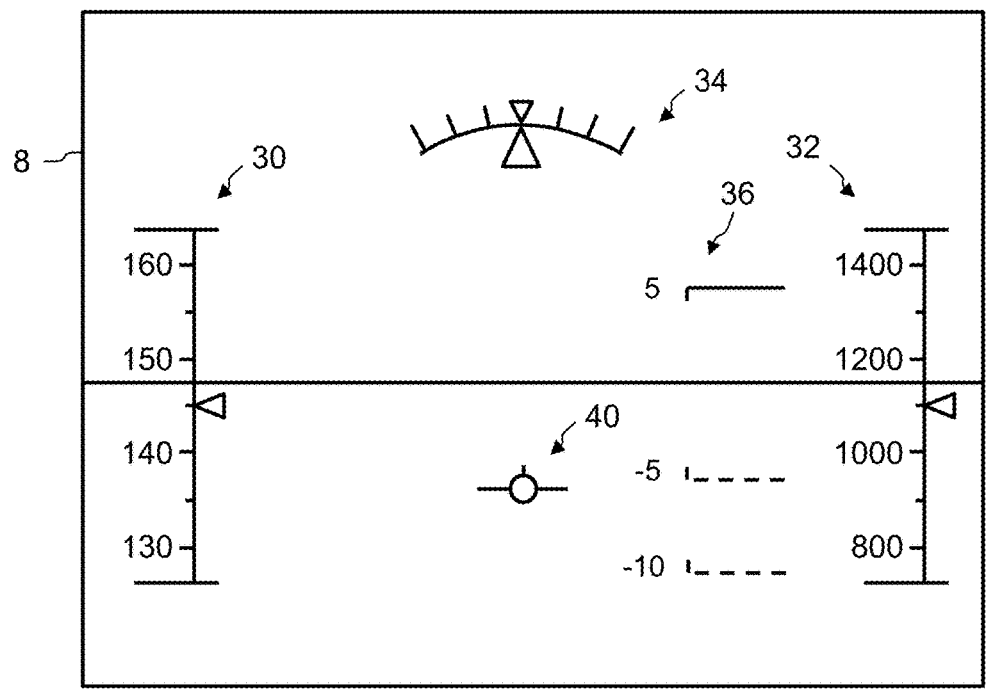
Figure 6B:
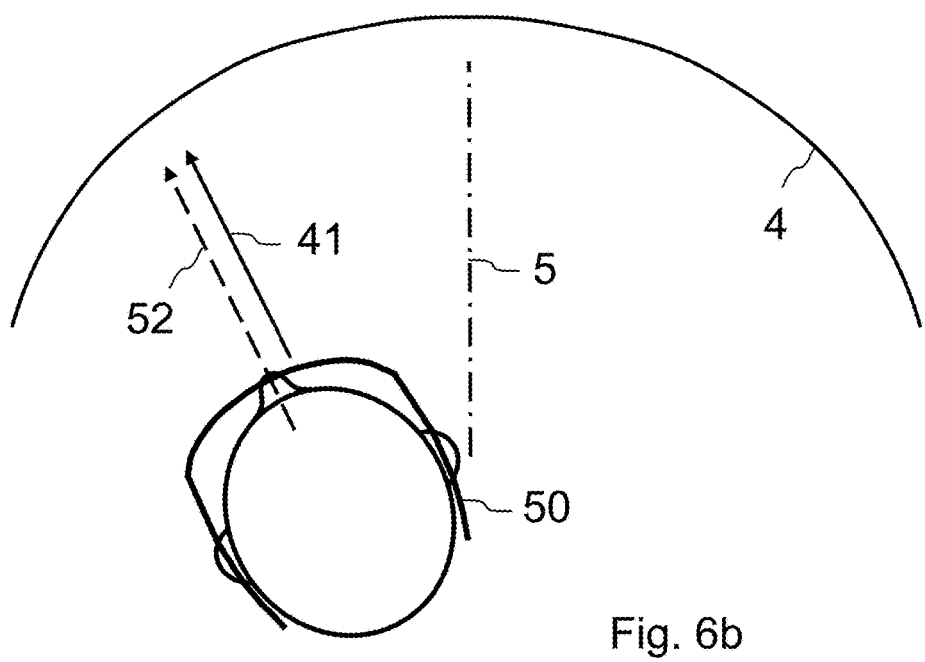

In a further example, illustrated by FIGS. 6a and 6b, the speed vector 41 is also oriented toward the front and toward the left of the aircraft. However, unlike the preceding example, the head of the user is also oriented toward the front and toward the left of the aircraft, so that the line 52 representing the orientation of the head of the user is parallel to the speed vector 41. Consequently, the speed vector symbol 40 is displayed in a conforming manner, centered laterally on the display unit 8. In this example it is considered that the aircraft speed vector and the head of the user are oriented too far toward the left of the aircraft to enable display of the aircraft reference symbol 38 on the display unit 8 in a conforming manner in fact, to be displayed in a conforming manner, the symbol 38 should be placed at a position outside the display unit 8, to its right. Consequently, the symbol 38 is not displayed on the display unit. Moreover, and advantageously, the attitude scale 36 is expanded laterally (or horizontally) so as to enable the display of a part of the attitude scale on the display unit 8. In fact, the attitude scale normally includes a left-hand part and a right hand part displayed on respective opposite sides of the aircraft reference symbol 38, as in the examples from FIGS. 4a and 5a. In the example from FIG. 6a, the right-hand part, normally situated to the right of the symbol 38, is not displayed because this symbol 38 cannot be displayed. In the absence of expansion of the scale 36, it would also not have been possible to display the left-hand part: its position would be either to the right of the display unit 8 or superimposed on the altitude scale 32, which would prevent its display for reasons of legibility. Here the lateral expansion of the scale 36 enables display of its left-hand part, to the left of the altitude scale 32. The user can therefore see the position of the aircraft speed vector symbol 40 relative to the graduations of the attitude scale, which enables them to deduce the slope of the aircraft.

Figure 12:
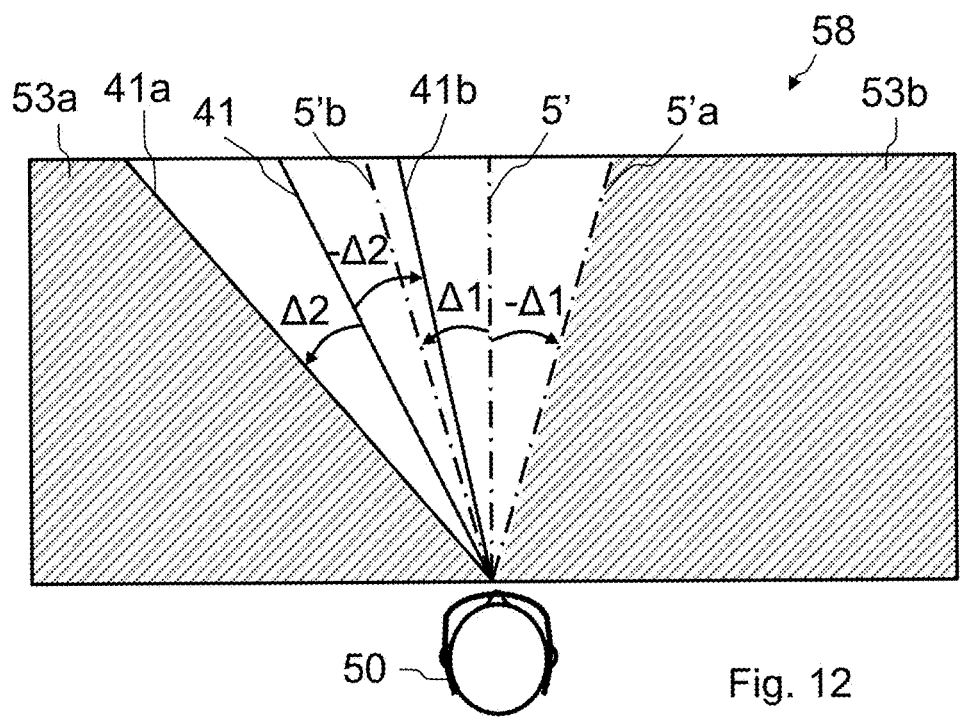
FIG. 12 show from above zones corresponding to different display modes as a function of the orientation of the head of a user of the HMD device conforming to one embodiment of the invention.

The examples represented in FIGS. 4a, 5a and 6a correspond to the first display mode in which at least one aircraft piloting assistance symbol, either the aircraft reference symbol 38 or the speed vector symbol 40, is displayed in a conforming manner on the display unit 8. The display on the display unit 8 corresponds to an augmented reality display superimposed on the environment of the aircraft that the user can see through the transparent display unit 8 and the windshield of the aircraft. As previously indicated, to determine if it should select this first display mode or another display mode, the display computer 18 determines at least one angular offset value between on the one hand a direction corresponding to the information on the orientation of the head of the user and on the other hand the longitudinal axis of the aircraft. In a first embodiment, the display computer 18 determines a lateral angular offset. Here the term lateral angular offset designates an angular offset considered in projection in a horizontal plane. For example, being shown from above in FIGS. 5b and 6b and consequently corresponding to a projection in a horizontal plane, the lateral angular offset corresponds to the angle between the longitudinal axis 5 of the aircraft and the line 52. This lateral angular offset varies as a function of the yaw angle ψ of the head 50 of the user. A variation of the yaw angle, and therefore of the angular offset, induces a lateral displacement of the symbol 38 and/or 40 displayed in a conforming manner on the display unit 8, whence the use of the term lateral to designate this angular offset. To determine the display mode that it must select, the display computer 18 evaluates at least one condition as a function of the value of the lateral angular offset. This condition includes at least one first elementary condition that is verified when the lateral angular offset is between a predetermined negative lateral angular offset threshold and a predetermined positive lateral angular offset threshold. In an example illustrated by FIG. 12, representing a space 58 situated in front of the head 50 of the user in the cockpit of the aircraft, the line 5' is parallel to the longitudinal axis 5 of the aircraft. Each of two lines 5'a and 5'b is at an angle of absolute value Δ1 to the line 5', showing the predetermined positive and negative lateral angular offset thresholds. In this particular example, these two thresholds have equal absolute values. The first elementary condition is therefore verified when the line 52 (not shown in FIG. 12) corresponding to the orientation of the head of the user is situated between the two lines 5'a and 5'b. The value of the angle Δ1 is chosen so that the aircraft reference symbol 38 can be displayed in a conforming manner on the display unit 8, in particular between the right and left edges of the display unit, when the absolute value of the lateral angular offset is less than or equal to Δ1. The condition evaluated by the display computer 18 advantageously includes a second elementary condition that is verified when a second lateral angular offset between the speed vector 41 and the line 52 (corresponding to the orientation of the head of the user) is between a second predetermined negative lateral angular offset threshold and a second predetermined positive lateral angular offset threshold. In FIG. 12, each of two lines 41a and 41b is at an angle of absolute value Δ2 to the speed vector 41, showing the predetermined second positive and negative lateral angular offset thresholds. In this particular example, these two thresholds have the same absolute value. The second elementary condition is therefore verified when the line 52 corresponding to the orientation of the head of the user is situated between the two lines 41a and 41b. The value of the angle Δ2 is chosen so that the speed vector symbol 40 can be displayed in a conforming manner on the display unit 8, in particular between the speed scale 30 and the altitude scale 32, when the absolute value of the second lateral angular offset is less than or equal to Δ2. In the example shown in FIG. 12 at least one of the first and second elementary conditions is verified when the line 52 corresponding to the orientation of the head of the user is situated between the two lines 41a and 5'a. The condition evaluated by the display computer 18 is then verified and the display computer controls the display on the display device 20 in accordance with the first display mode. When the line 52 is situated outside the lines 41a and 5'a, in one of the shaded areas 53a and 53b, neither of the two elementary conditions is verified. The condition evaluated by the display computer 18 is then not verified and the display computer controls the display on the display device 20 in accordance with a second display mode. The condition evaluated by the display computer 18 is therefore the equivalent of a logic OR operation applied to the first elementary condition and the second elementary condition. This condition is therefore verified as long as the aircraft reference symbol 38 and/or the speed vector symbol 40 can be displayed in a conforming manner on the display unit 8. Also, a time-delay is advantageously initialized when the condition is not verified and the display computer activates the second display mode only at the end of the time-delay if the condition has continued not to be verified throughout the duration of the time-delay. This makes it possible to avoid untimely changes from the first display mode to the second display mode and then back to the first display mode when the user is called on to turn their head briefly to look to one side of the cockpit, before returning their head to its initial orientation. This is also advantageous when turbulence causes brief movements of the head of the user. The value of the time-delay is for example chosen in a range of 1 to 2 seconds. The change from the second display mode to the first display mode is advantageously immediate when the condition is verified again, which enables the user to access immediately a conforming display of the at least one symbol. In particular, the change from the first display mode to the second display mode and vice versa is carried out progressively over a predetermined duration, equal to one second for example, notably using a cross-fade technique.

Figure 7A:
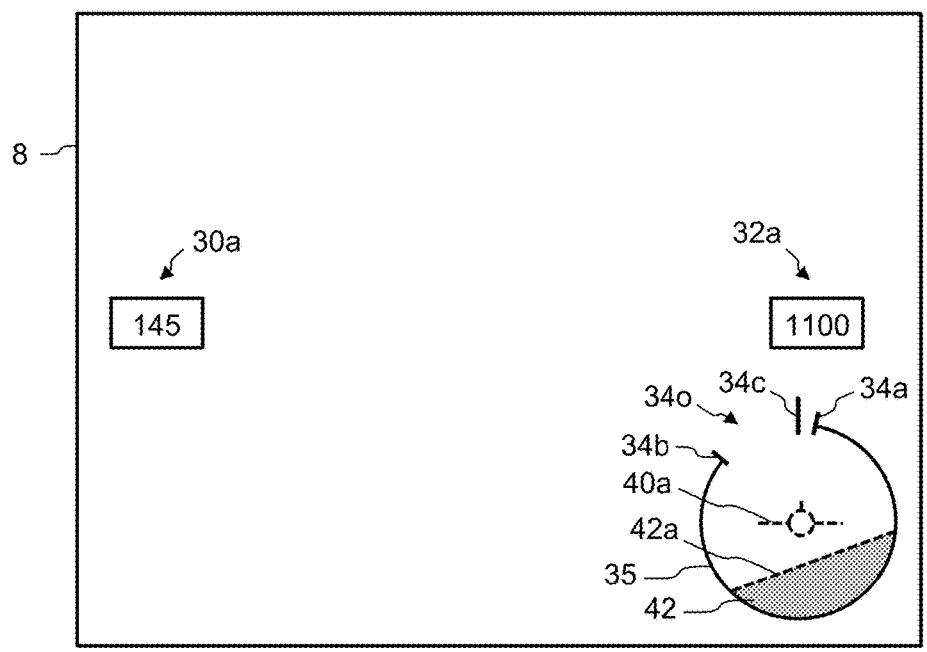
Figure 7B:
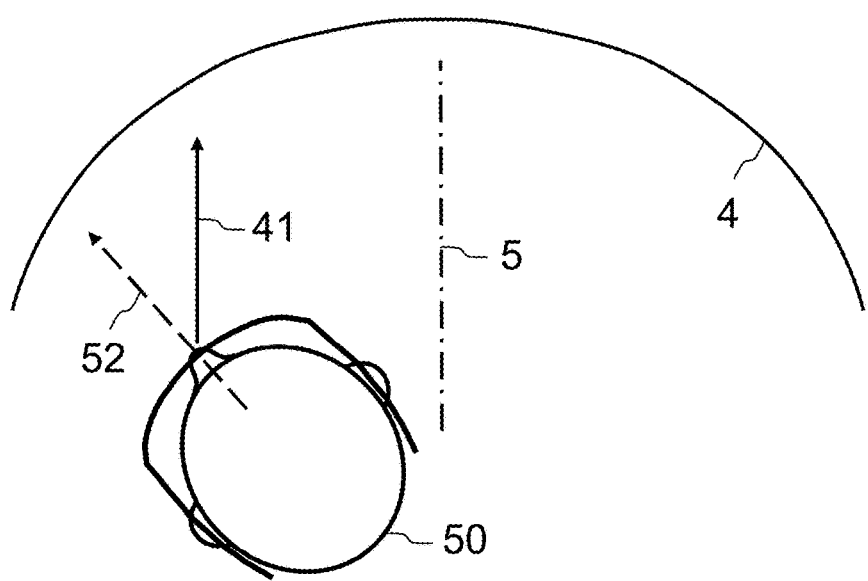

FIGS. 7a and 7b show an example of a display in accordance with the second display mode. As shown in FIG. 7b, the speed vector 41 is parallel to the longitudinal axis 5 of the aircraft. The head 50 of the user is oriented toward the front and the left of the aircraft so that the line 52 is at an angle to the longitudinal axis of the aircraft (and to the speed vector 41) having an absolute value greater than Δ1 and Δ2. Consequently, the condition evaluated by the display computer 18 is not verified and the display computer therefore controls the display in accordance with the second display mode. The display on the display unit 8, shown in FIG. 7a, then includes a speed vector symbol 40a displayed in a non-conforming manner, i.e., at a position on the display that is not representative of the orientation of the speed vector of the aircraft relative to the external environment of the aircraft visible through the display unit 8. The symbol 40a is shown inside a circle 35. The display further comprises a symbol 42a corresponding to a chord of the circle 35 and representing a horizon line, this symbol also being displayed in a non-conforming manner. The symbols 40a and 42a are advantageously displayed in dashed line to warn the user that they are displayed in a non-conforming manner. The display advantageously also includes a sector 42 of the circle 35 between the symbol 42a and the perimeter of the circle 35 and below the symbol 42a. This sector 42, which symbolizes the space below the horizon forward of the aircraft, is colored so as to make the user more aware of the situation. The aircraft speed vector symbol 40a and the symbol 42a representing the horizon line are displayed relative to each other so as to indicate a climbing movement or a descending movement of the aircraft. When the symbol 40a is displayed under the symbol 42a, this enables the user to be informed that the aircraft is descending and when the symbol 40a is displayed above the symbol 42a, this enables the user to be informed that the aircraft is climbing. As shown in FIG. 7a, the symbol 42a representing the horizon line is preferably inclined to a horizontal direction as a function of the roll angle of the aircraft. This inclination of the symbol 42a enables the user to be aware of the roll angle of the aircraft. In one particular embodiment shown in FIG. 7a, the circle 35 includes an open portion 34o between two lines 34a and 34b and the display includes a marker 34c. The position relative to the circle 35 of the open portion 34o and the two lines 34a and 34b depends on the roll angle of the aircraft. The spacing between the lines 34a and 34b is chosen so that the marker 34c is displayed between these two lines when the roll angle of the aircraft is situated in a range of acceptable roll angles relative to the flight domain of the aircraft. This makes it possible to assist the user in appropriately controlling the roll angle of the aircraft. The symbol 40a is advantageously displayed in a non-conforming manner at a position characteristic of a direction toward which the user can orient their head to obtain a conforming display of the at least one symbol in the first display mode: the symbol 40a is therefore displayed near the right-hand edge of the display unit 8 so as to indicate to the user that they can orient their head toward the right to obtain a conforming display of the speed vector symbol 40, in accordance with the first display mode. Similarly, when the head of the user is oriented toward the front and toward the right of the aircraft so that the condition evaluated by the display computer 18 is not verified, the display computer therefore controls the display in accordance with the second display mode and the symbol 40a is displayed near the left-hand edge of the display unit 8. This indicates to the user that they can orient their head toward the left to obtain a conforming display of the speed vector symbol 40, in accordance with the first display mode.

On the other hand, in this second display mode, the altitude and speed scales are respectively replaced by displays 32a of a current altitude value and 30a of a current speed value.

In the second display mode, the display therefore includes a reduced number of items of information compared to the display corresponding to the first display mode. This contributes to facilitate the user becoming aware of the fact that the display corresponds to this second display mode. However, the user has available to them most of the piloting assistance information necessary for piloting the aircraft, even if none of the information is displayed in a conforming manner. Moreover, if they deem it necessary to have piloting assistance information displayed in a conforming manner, the display indicates in which direction they can turn their head to obtain a conforming display in accordance with the first display mode.

Figure 7C:
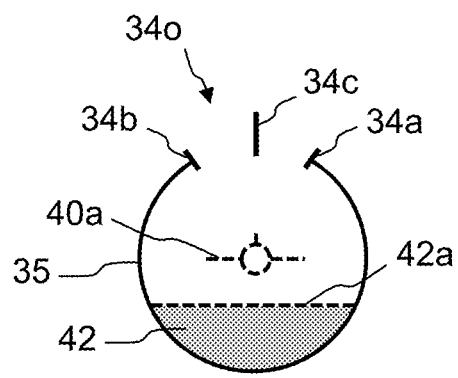
Figure 7D:
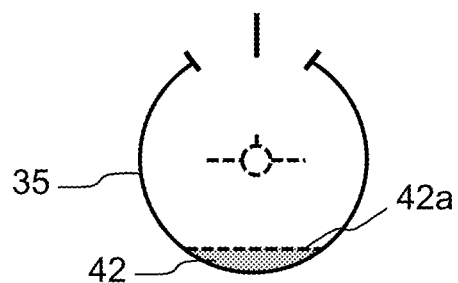
Figure 7E:
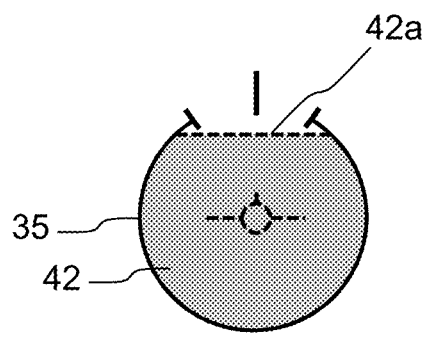

FIGS. 7c, 7d and 7e show other examples of a display in accordance with this second display mode. In these figures, the symbol 42a is horizontal, corresponding to a zero roll axis. The marker 34c is then substantially centered between the lines 34a and 34b. In FIG. 7c, the speed vector symbol 40a is situated above the symbol 42a: the aircraft if therefore climbing. FIG. 7d also corresponds to a situation in which the aircraft is climbing, with an attitude angle greater than that corresponding to FIG. 7c, given that the symbol 42a is represented at a position lower than its position in FIG. 7c. The display from FIG. 7d moreover corresponds to the lowest position of the symbol 42a: in fact, even if the attitude angle of the aircraft continues to increase, the symbol 42a remains displayed at this position in order for the user to be able to see this symbol anyway. Similarly, in FIG. 7e, the symbol 42a is displayed at a highest position: even if the attitude angle of the aircraft continues to decrease, the symbol 42a remains displayed at this position in order for the user to be able to see this symbol anyway. In this FIG. 7e the symbol 40a is situated below the symbol 42a, which corresponds to a situation with the aircraft descending.

Figure 13:
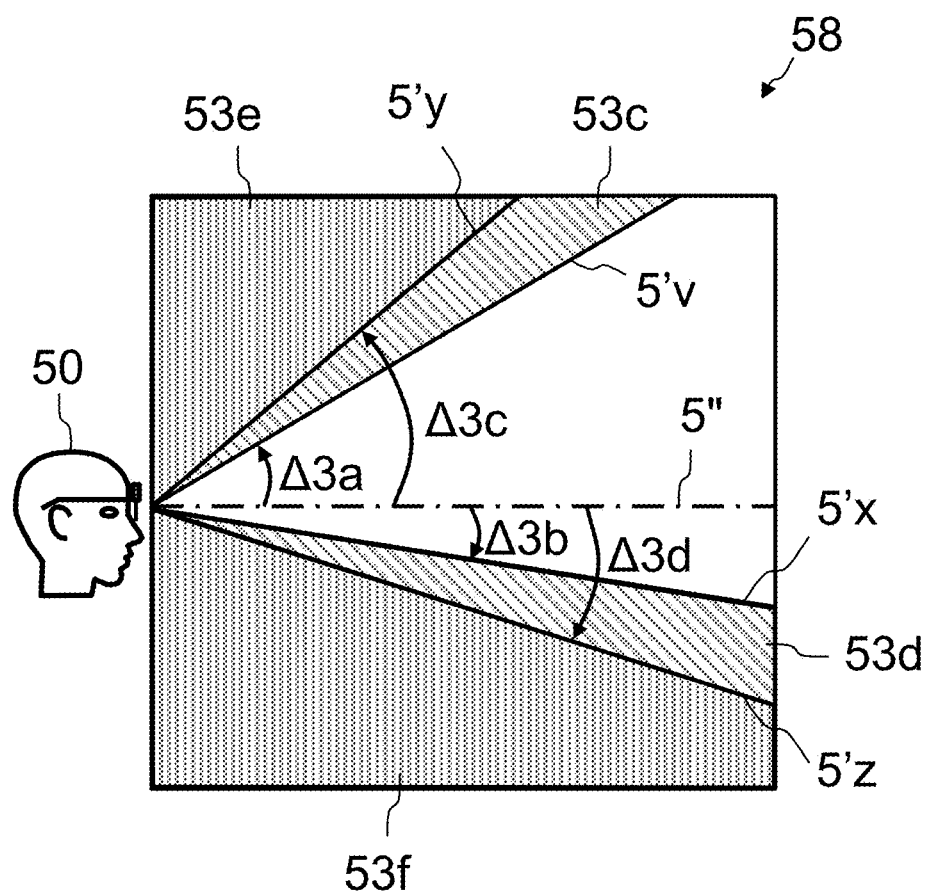
FIG. 13 shows from the side zones corresponding to different display modes as a function of the orientation of the head of a user of the HMD device conforming to one embodiment of the invention.

In a second embodiment, the display computer 18 determines a vertical angular offset. Here the term vertical angular offset designates an angular offset considered in projection in a vertical plane. For example, in FIGS. 9b and 10b, as seen in side view and consequently corresponding to a projection in a vertical plane, the vertical angular offset corresponds to the angle θ between a line 5″ parallel (in projection in the vertical plane) to the longitudinal axis of the aircraft and the line 52. This vertical angular offset corresponds to the pitch angle of the head 50 of the user. A variation of the pitch angle, and therefore of the angular offset, induces a vertical displacement of the symbols 38 and/or 40 displayed in a conforming manner on the display unit 8 in the first display mode, whence the use of the term vertical to designate this angular offset. To determine the display mode that it must select, the display computer 18 evaluates at least one condition as a function of the value of the vertical angular offset. This condition includes at least one elementary condition that is verified when the vertical angular offset is between a predetermined negative vertical angular offset threshold and a predetermined positive vertical angular offset threshold. An example illustrated by FIG. 13 represents a space 58 situated in front of the head 50 of the user in the cockpit of the aircraft, in side view and in projection in a vertical plane. Two lines 5'v and 5'x at respective angles Δ3a and Δ3b to the line 5'' show the predetermined positive and negative vertical angular offset thresholds. Accordingly, the elementary condition is verified when the line 52 (not shown in FIG. 13) corresponding to the orientation of the head of the user is situated between the two lines 5'v and 5'x. The values of the angles Δ3a and Δ3b are preferably chosen so that when the line 52 is situated between the two lines 5'v and 5'x the display on the display unit 18 is an augmented reality display superimposed on the external environment of the aircraft visible through the windshield of the cockpit. Two lines 5'y and 5'z are advantageously at angles Δ3c and Δ3d to the line 5'', corresponding to a second positive vertical angular offset threshold and to a second negative vertical angular offset threshold. The lines 5'v and 5'y delimit a zone 53c of the space 58 corresponding to pitch angles of the head of the user between Δ3a and Δ3c inclusive. The lines 5'x and 5'z delimit a zone 53d of the space 58 corresponding to pitch angles of the head of the user between Δ3b and Δ3d inclusive. A zone 53e corresponds to pitch angles greater than Δ3c and a zone 53f corresponds to pitch angles less than Δ3d. When the orientation of the head of the user is such that the line 52 is situated between the lines 5'v and 5'x (the pitch angle of the head of the user is between the predetermined negative vertical angular offset threshold Δ3b and the predetermined positive vertical angular offset threshold Δ3a inclusive), the elementary condition is verified and the display computer 18 controls the display in accordance with the first display mode. When the elementary condition is not verified, the display computer 18 controls the display in accordance with a third display mode in which the display corresponding to the first display mode is at least partly masked. This display is advantageously partly masked when the orientation of the head of the user is such that the line 52 is situated in one of the zones 53c or 53d and the display is totally masked when the orientation of the head of the user is such that the line 52 is situated in one of the zones 53e or 53f. The values of the angles Δ3a and Δ3b being chosen as indicated above, when the display computer 18 controls the display in accordance with the first display mode, that display can be seen by the user superimposed on the environment of the aircraft seen through the cockpit windshield. The user can therefore see the symbol or symbols displayed in a conforming manner superimposed on the environment. When the pitch angle of the head of the user is such that the line 52 is situated in one of the zones 53c or 53d, the environment that can be seen by the user through the display unit 8 of the display device 20 corresponds in part to the external environment of the aircraft (through the cockpit windshield) and in part to the interior of the cockpit. For example, in the zone 53c, the environment that can be seen by the user through an upper part of the display unit 8 corresponds to switch panels on the ceiling of the cockpit. In the zone 53d the environment that the user can see through a lower part of the display unit 8 corresponds to a part of the cockpit situated below the windshield, for example a flight control unit (FCU), and possibly head-down display screens of the cockpit. In the third display mode, the display on the display unit 8 is then partly masked so as to display information on the display unit 8 only in a part of the display unit 8 such that this information can be seen by the user superimposed on the external environment of the aircraft. The display is masked in the part of the display (upper part or lower part, according to the situation) where the environment that can be seen by the user through this part of the display unit corresponds to the interior of the cockpit.

Figure 9A:
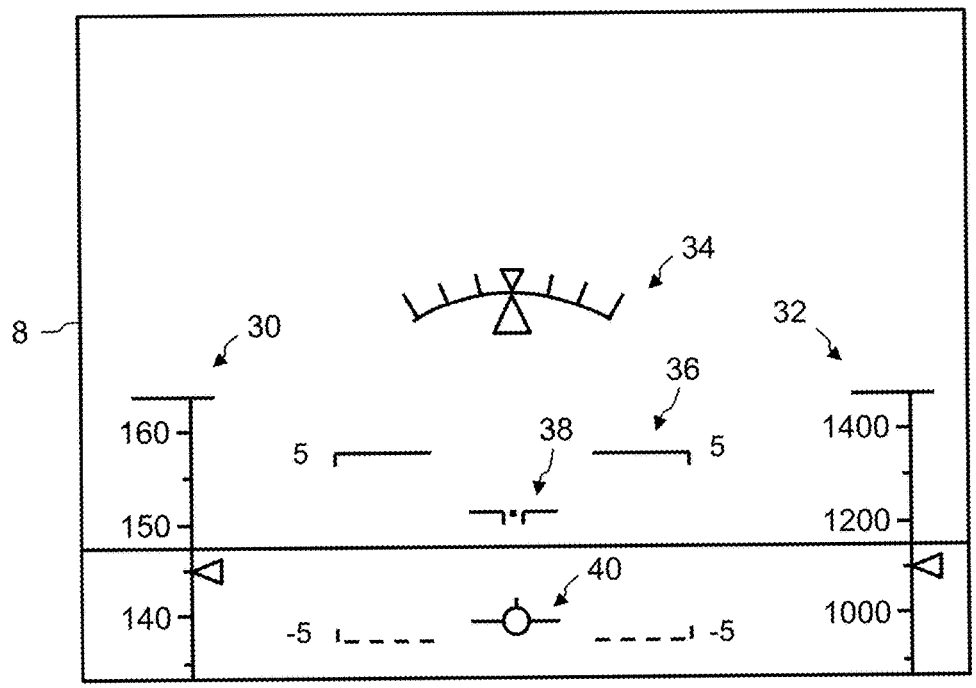
Figure 9B:
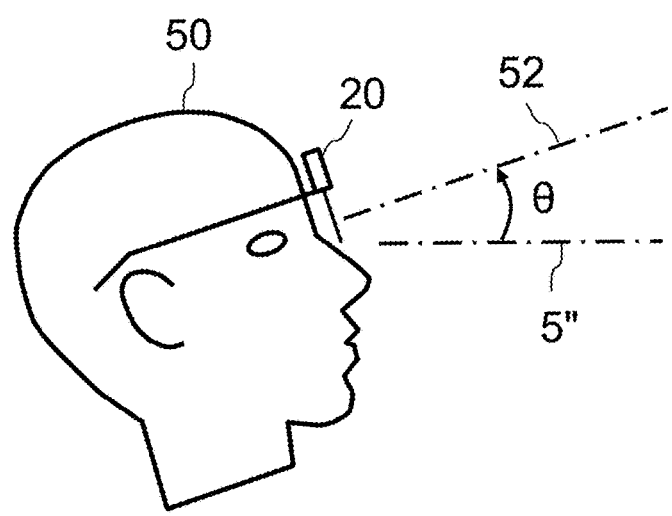

FIG. 9a shows a partly masked display on the display unit 8 corresponding to the orientation of the head 50 of the user shown in FIG. 9b. The pitch angle θ of the head of the user is between the positive vertical angular offset threshold Δ3a and the second positive vertical angular offset threshold Δ3c. Consequently, the environment that can be seen by the user through the upper part of the display unit 8 corresponds to the ceiling of the cockpit, in particular to switch panels of the cockpit. The display is partly masked such that no information is displayed in the upper part of the display 8. The information displayed in a non-conforming manner, in particular the roll scale 34, altitude scale 32 and speed scale 30, are preferably offset downward on the display unit 8 relative to their respective positions in the first display mode. The more the user raises their head toward the ceiling of the cockpit (and thus the greater the pitch angle θ) the farther toward the bottom of the display unit 8 the scales are offset. When their display is possible, the aircraft reference symbol 38 and/or the speed vector symbol 40 are displayed in a conforming manner, as in the first display mode.

Figure 10A:
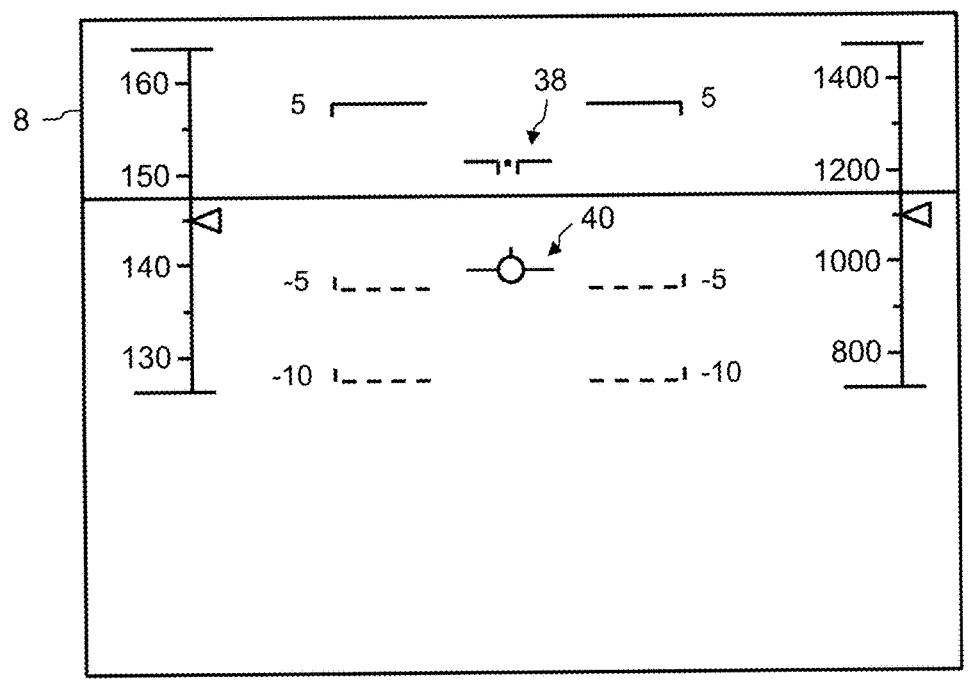
Figure 10B:
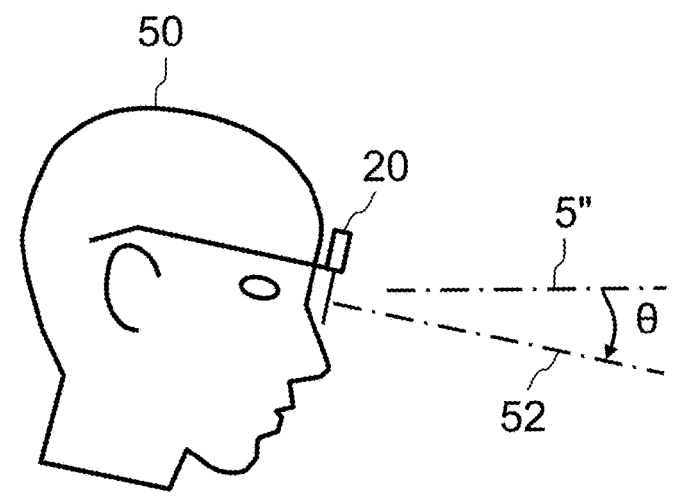

Similarly, FIG. 10a shows a partly masked display on the display unit 8 corresponding to the orientation of the head 50 of the user shown in FIG. 10b. The pitch angle θ of the head of the user is between the negative vertical angular offset threshold Δ3b and the second negative vertical angular offset threshold Δ3d inclusive. The environment that can be seen by the user through the lower part of the display unit 8 notably corresponds to the FCU in the cockpit. The display is partly masked such that no information is displayed in the lower part of the display unit 8. The information displayed in a non-conforming manner, in particular the roll scale 34, altitude scale 32 and speed scale 30, are preferably offset upwards on the display unit 8 relative to their respective positions in the first display mode. As a result of this the roll scale 34 is not displayed in the example shown in FIG. 10a. The more the user lowers their head toward the floor of the cockpit (and thus the lower the pitch angle θ) the more the scales are offset toward the top of the display unit 8. When their display is possible, the aircraft reference symbol 38 and/or the speed vector symbol 40 are displayed in a conforming manner, as in the first display mode.

The values of the second positive and negative vertical angular offset thresholds Δ3c and Δ3d (respectively corresponding to the lines 5'y and 5'z) are advantageously chosen so as to correspond to pitch angles of the head of the user from which the external environment of the aircraft that can be seen through the windshield of the cockpit can no longer be seen through the display unit 8. Accordingly, when the user raises their head toward the ceiling of the cockpit, as long as the pitch angle θ of their head is less than Δ3a, the whole of the environment that can be seen by the user through the display unit 8 corresponds to the external environment of the aircraft that can be seen through the windshield and the display computer 18 controls the display in accordance with the first display mode. If the user continues to raise their head toward the ceiling of the cockpit, from the moment at which the pitch angle θ of their head becomes greater than Δ3a, while remaining less than Δ3c, the upper part of the environment that can be seen by the user through the display unit 8 corresponds to the ceiling of the cockpit and the display is partly masked as already described. The more the user raises their head, the more the information displayed in a non-conforming manner, in particular the scales, are offset toward the bottom of the display unit 8. If the user continues to raise their head toward the ceiling of the cockpit, from the moment at which the pitch angle θ of their head becomes greater than Δ3c, the environment that can be seen by the user through the display unit 8 corresponds in its entirety to the ceiling of the aircraft and consequently the display on the display unit 8 is totally masked. Similarly, when the user lowers their head toward the floor of the cockpit, as long as the pitch angle θ of their head is greater than Δ3b, the entirety of the environment that can be seen by the user through the display unit 8 corresponds to the external environment of the aircraft that can be seen through the windshield and the display computer 18 controls the display in accordance with the first display mode. If the user continues to lower their head toward the floor of the cockpit, from the moment at which the pitch angle θ of their head becomes less than Δ3b, while remaining greater than Δ3d, the lower part of the environment that can be seen by the user through the display unit 8 corresponds to the FCU and possibly to head-down screens in the cockpit and the display is partly masked. The more the user lowers their head, the more the information displayed in a non-conforming manner, in particular the scales, are offset toward the top of the display unit 8. If the user continues to lower their head toward the floor of the cockpit, from the moment at which the pitch angle θ of their head becomes less than Δ3d, the environment that can be seen by the user through the display unit 8 corresponds in its entirety to the FCU and to head-down screens in the cockpit, and consequently the display on the display unit 8 is completely masked.

Figure 11:
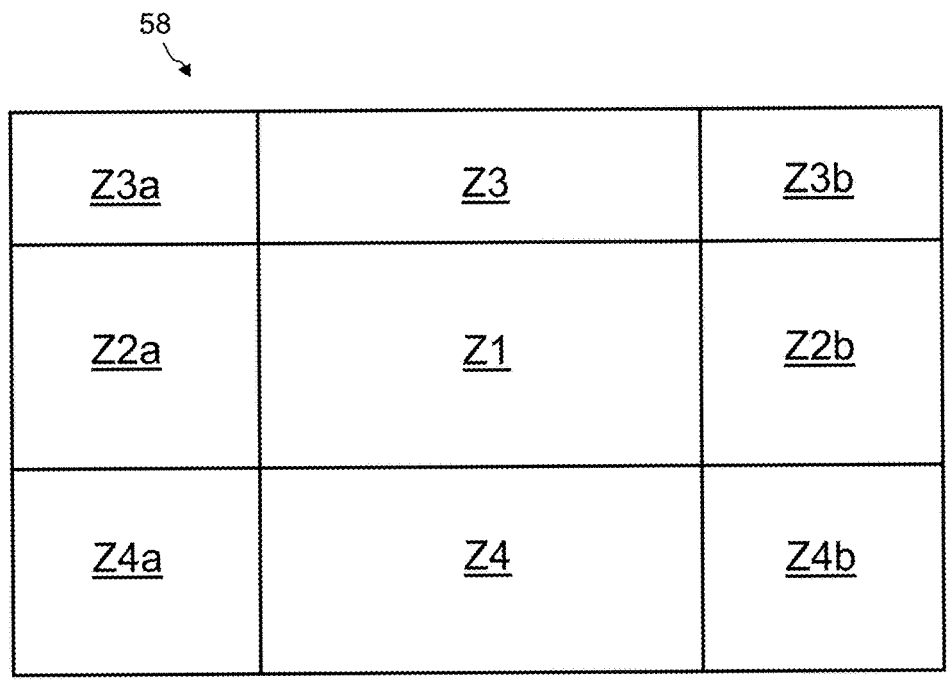
FIG. 11 shows in a vertical plane perpendicular to a longitudinal axis of the aircraft zones corresponding to different display modes conforming to embodiments of the invention as a function of the orientation of the head of a user of the HMD device.

The first embodiment and the second embodiment can be combined with each other. FIG. 11 shows an example of the combination of the two embodiments, being a sectional view in a vertical plane perpendicular to the longitudinal axis of the aircraft of a space 58 situated forward of the head 50 of the user in the cockpit of the aircraft. Its zone Z1 corresponds to the display in accordance with the first display mode, when the line 52 corresponding to the orientation of the head 50 of the user intersects the vertical plane in this zone Z1. Two zones Z2a and Z2b respectively situated to the left and to the right of the zone Z1 correspond to a display in accordance with the second display mode, when the line 52 corresponding to the orientation of the head 50 of the user intersects the vertical plane in one of the zones Z2a or Z2b. These two zones respectively correspond to the zones 53a and 53b already described with reference to FIG. 12. Two zones Z3 and Z4, respectively situated above and below the zone Z1, correspond to a display in accordance with the third display mode, when the line 52 corresponding to the orientation of the head 50 of the user intersects the vertical plane in one of the zones Z3 or Z4. These two zones respectively correspond to the zones 53c and 53e on the one hand and 53d and 53f on the other hand already described with reference to FIG. 13. As already described with reference to FIGS. 9a, 10a and 13, the zones 53c and 53d and therefore the zone Z3 correspond to a display in accordance with the third display mode. That display is based on that of the first display mode but it is at least partly masked in an upper part of the display unit 8. Two zones Z3a and Z3b are respectively situated to the left and to the right of the zone Z3. These two zones Z3a and Z3b are respectively situated above the zones Z2a and Z2b. Consequently, like the latter, they correspond to yaw angle values of the head of the user for which the line 52 is situated in one of the zones 53a or 53b shown in FIG. 12. In these two zones Z3a and Z3b, the display is at least partly masked, as in the zone Z3, but instead of being based on the first display mode, it is based on the second display mode. Similarly, two zones Z4a and Z4b are respectively situated to the left and to the right of the zone Z4. These two zones Z4a and Z4b are situated under the zones Z2a and Z2b, respectively. Consequently, like the latter, they correspond to values of the yaw angle of the head of the user for which the line 52 is situated in one of the zones 53d or 53f shown in FIG. 12. In these two zones Z4a and Z4b the display is at least partly masked, as in the zone Z4, but instead of being based on the first display mode it is based on the second display mode.

Figure 8A:
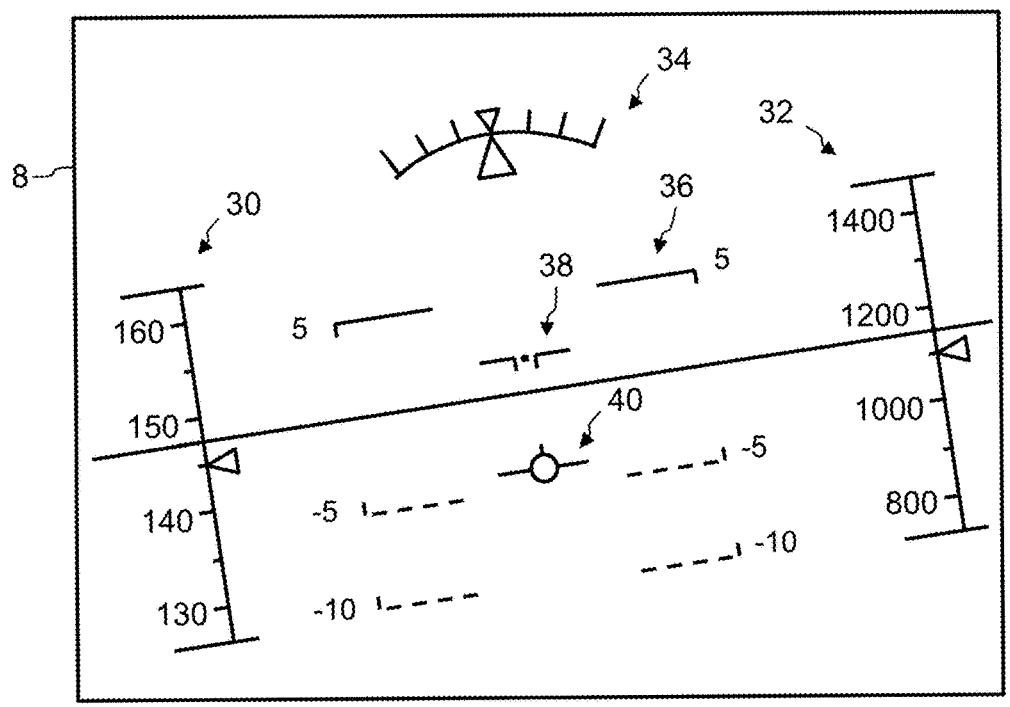
Figure 8B:
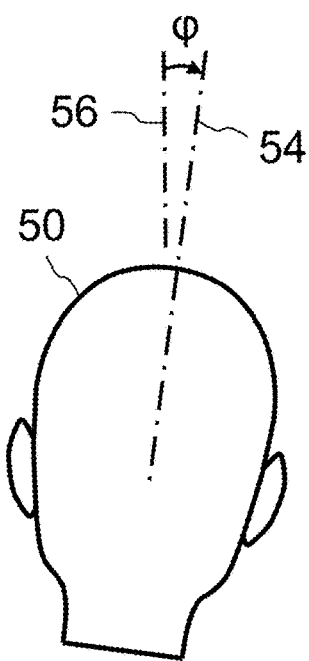

FIGS. 8a and 8b show one particular embodiment in which the display computer 18 adapts the display on the display unit 8 as a function of the roll angle of the head of the user. FIG. 8b illustrates a situation in which the head 50 of the user (seen from behind) is inclined toward the right at a roll angle φ. In a situation of this kind, in the first display mode, the display controlled by the display computer 18 on the display unit 8 corresponds to that shown in FIG. 8a. In this display the roll scale 34, altitude scale 32 and speed scale 30, although displayed in a non-conforming manner, are rotated by an angle −φ so as to compensate the inclination of the head of the user. Accordingly, as seen by the user, these scales appear fixed in a frame of reference linked to the aircraft: for example, the altitude scale 32 and the speed scale 30 are permanently displayed in a vertical manner in the cockpit. This enables the user to become aware of the fact that they are inclining their head relative to the cockpit. The aircraft reference symbol 38 and speed vector symbol 40 are for their part displayed in a conforming manner when they can be displayed. This particular embodiment is applicable as much in the first display mode as in the third display mode when the display is partly masked, the scales then being at least partly displayed.

In one particular embodiment, in the third display mode the display computer 18 controls the display of at least one virtual instrument in a part of the display in which the display is masked. As previously indicated, the environment that can be seen by the user through this part of the display preferably corresponds to an interior part of the cockpit of the aircraft, for example the ceiling of the cockpit or a part of the cockpit situated below the windshield. In accordance with one variant, the virtual instrument corresponds for example to a virtual button or to a lamp on a virtual control panel that can be seen superimposed on the ceiling of the cockpit. According to another variant, combinable with the preceding one, the virtual instrument corresponds for example to a virtual head-down screen that can be seen superimposed on a part of the cockpit situated below the windshield.

In one particular embodiment, the cockpit of the aircraft includes a device for adjusting the position of the user in the cockpit. This device corresponds for example to a usual set of three balls situated in the vicinity of the windshield. When the orientation of the head of the user is such that the line 52 intersects a zone around the device for adjusting the position of the user for longer than a time-delay of predetermined duration, the display computer controls the display on the display unit 8 of a symbol corresponding to the device for adjusting the position of the user. The value of the predetermined time delay is for example made equal to two seconds. The zone around the device for adjusting the position of the user is defined for example in a vertical plane perpendicular to the longitudinal axis of the aircraft. For example, it is defined by a yaw angle margin and by a pitch angle margin for the head of the user. These margins are made sufficient to enable the detection by the display computer 18 of the fact that the user is looking at the device for adjusting the position of the user taking account of the fact that the head of the user is not perfectly mobile. Nevertheless, these margins are made sufficiently small to be able to avoid untimely detection because the user is looking at the device for adjusting the position of the user, even while observing the external environment of the aircraft. The display on the display unit 8 of the symbol corresponding to the user position adjustment device enables the user to verify if the position of the symbol calculated by the display computer 18 is indeed superimposed on the real device for adjusting the position of the user that can be seen through the display. If this is the case, the user knows that the display system is correctly aligned and that they can have confidence in the position of the information displayed on the display unit, in particular the positions of the symbols displayed in a conforming manner. On the other hand, if the position of the symbol calculated by the display computer 18 is not correctly superimposed on the real device for adjusting the position of the user visible through the display unit, the user knows that they must not use the display system. The alignment of the display system must then be reinitialized during an aircraft maintenance operation. Verification in the manner described above of the alignment of the display system can in particular be carried out before any use of the system during an approach procedure with a view to landing on a runway of an airport.

In one advantageous embodiment the display system further includes a sensor of the position of the head of the user. According to a first variant, this position sensor is independent of the sensor 16 of the orientation of the head of the user. According to a second variant, this position sensor is integrated into the sensor 16 of the orientation of the head of the user. The display computer is then configured to acquire information supplied by this position sensor and to determine the angular offset value as a function of both the orientation of the head of the user and the position of the head of the user. This embodiment is of interest notably when the user's position in the cockpit of the aircraft is such that the position of their head does not correspond to a theoretical position. This then results in a better match between on the one hand the zones 53c, 53e, 53d and 53f and on the other hand the environment that can be seen by the user as a function of the real position of their head.

The display system 10 described above may equally well comprise a monocular system or a binocular system. In the case of a monocular system, the display device 20 includes only one display unit 8. In the case of a binocular system, the display device 20 includes two display units 8, each dedicated to one eye of the user.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A display system for a cockpit of an aircraft, comprising:
   a display device configured to be secured to the head of a user in the cockpit of the aircraft;
   a sensor for the orientation of the head of the user of the display device; and
   a display computer configured to control the display of information relating to the flight of the aircraft on the display device, in which the display computer is configured;
   to acquire information on the orientation of the head of the user supplied by the sensor;
   to determine at least one angular offset value between a direction corresponding to said information on the orientation of the head of the user and a longitudinal axis of the aircraft;
   to evaluate at least one condition as a function at least of said angular offset value; and
   to control the display on the display device in accordance with:
   a first display mode when said condition is verified, this first display mode corresponding to a display comprising at least one aircraft piloting assistance symbol displayed in a conforming manner; and
   another display mode when said condition is not verified, wherein:
   the angular offset value comprises a lateral angular offset and said condition includes at least one first elementary condition that is verified when the lateral angular offset is between a predetermined negative lateral angular offset threshold and a predetermined positive lateral angular offset threshold inclusive; and
   when the first elementary condition is not verified, the other display mode corresponds to a second display mode in which the at least one aircraft piloting assistance symbol is displayed in a non-conforming manner,
   wherein when the at least one aircraft piloting assistance symbol is displayed in a non-conforming manner, this at least one aircraft piloting assistance symbol is displayed at a position characteristic of a direction toward which the user can orient the user head to obtain a conforming display of the at least one aircraft piloting assistance symbol in the first display mode.

2. The system as claimed in claim 1, wherein the at least one aircraft piloting assistance symbol is chosen from the following symbols: an aircraft speed vector symbol; and an aircraft reference symbol.

3. The system as claimed in claim 2, wherein said condition further includes a second elementary condition that is verified when the value of a second lateral angular offset between the direction corresponding to the orientation of the head of the user and the aircraft speed vector is between a second predetermined negative lateral angular offset threshold and a second predetermined positive lateral angular offset threshold inclusive.

4. The system as claimed in claim 1, wherein the at least one symbol is an aircraft speed vector symbol and the display further comprises a symbol representing a horizon line, the aircraft speed vector symbol and the symbol representing the horizon line being displayed relative to each other so as to indicate a climbing movement or a descending movement of the aircraft.

5. The system as claimed in claim 1, wherein, in the second display mode, the display further comprises a symbol representing the roll of the aircraft shown in association with the at least one symbol.

6. The system as claimed in claim 1, wherein, in the second display mode, the display also includes a reduced number of information items relative to the display corresponding to the first display mode.

7. The system as claimed in claim 1, wherein the angular offset value comprises a vertical angular offset and said condition includes at least one elementary condition that is verified when the vertical angular offset is between a predetermined negative vertical angular offset threshold and a predetermined positive vertical angular offset threshold inclusive, and when this elementary condition is not verified, the other display mode corresponds to a third display mode in which the display corresponding to the first display mode is at least partially masked.

8. The system as claimed in claim 1, wherein, in the first display mode, the display comprises at least part of an attitude scale and, if necessary, this attitude scale is expanded laterally as a function of the orientation of the head of the user in order to enable the display of said at least part of the attitude scale.

9. The system as claimed in claim 1, wherein, in the first display mode, the display further comprises at least one of a speed scale or an altitude scale and the display computer controls the display on the display device so that the speed scale or the altitude scale are displayed vertically in a frame of reference tied to the aircraft.

10. An aircraft which includes a display system as claimed in claim 1.

11. A method of display in a cockpit of an aircraft, the aircraft including a display system comprising:
a display device configured to be secured the head of a user in the cockpit of the aircraft;
a sensor for the orientation of the head of a user of the display device; and
a display computer configured to control the display of information relating to the flight of the aircraft on the display device,
the method including the following steps executed by the display computer:
acquiring information on the orientation of the head of the user supplied by the sensor;
determining at least one angular offset value between a direction corresponding to said information on the orientation of the head of the user and a longitudinal axis of the aircraft;
evaluating at least one condition as a function at least of said angular offset value; and
controlling the display on the display device in accordance with:
a first display mode when said condition is verified, this first display mode corresponding to a display comprising at least one aircraft piloting assistance symbol to aid with the piloting of the aircraft displayed in a conforming manner; and
another display mode when said condition is not verified,
wherein:
the angular offset value comprises a lateral angular offset and said condition includes at least one first elementary condition that is verified when the lateral angular offset is between a predetermined negative lateral angular offset threshold and a predetermined positive lateral angular offset threshold inclusive; and
when the first elementary condition is not verified, the other display mode corresponds to a second display mode in which the at least one aircraft piloting assistance symbol is displayed in a non-conforming manner,
wherein when the at least one aircraft piloting assistance symbol is displayed in a non-conforming manner, this at least one aircraft piloting assistance symbol is displayed at a position characteristic of a direction toward which the user can orient the user head to obtain a conforming display of the at least one aircraft piloting assistance symbol in the first display mode.

12. A display system for a cockpit of an aircraft, comprising:
a display device configured to be secured to the head of a user in the cockpit of the aircraft;
a sensor for the orientation of the head of the user of the display device; and
a display computer configured to control the display of information relating to the flight of the aircraft on the display device,
in which the display computer is configured:
to acquire information on the orientation of the head of the user supplied by the sensor;
to determine at least one angular offset value between a direction corresponding to said information on the orientation of the head of the user and a longitudinal axis of the aircraft;
to evaluate at least one condition as a function at least of said angular offset value; and
to control the display on the display device in accordance with:
a first display mode when said condition is verified, this first display mode corresponding to a display comprising at least one aircraft piloting assistance symbol displayed in a conforming manner; and
another display mode when said condition is not verified,
wherein:
the angular offset value comprises a lateral angular offset and said condition includes at least one first elementary condition that is verified when the lateral angular offset is between a predetermined negative lateral angular offset threshold and a predetermined positive lateral angular offset threshold inclusive; and
when the first elementary condition is not verified, the other display mode corresponds to a second display mode in which the at least one aircraft piloting assistance symbol is displayed in a non-conforming manner,
wherein the angular offset value comprises a vertical angular offset and said condition includes at least one elementary condition that is verified when the vertical angular offset is between a predetermined negative vertical angular offset threshold and a predetermined positive vertical angular offset threshold inclusive, and when this elementary condition is not verified, the other display mode corresponds to a third display mode in which the display corresponding to the first display mode is at least partially masked.

13. A display system for a cockpit of an aircraft, comprising:
a display device configured to be secured the head of a user in the cockpit of the aircraft;
a sensor for the orientation of the head of the user of the display device; and
a display computer configured to control the display of information relating to the flight of the aircraft on the display device, in which the display computer is configured:
- to acquire information on the orientation of the head of the user supplied by the sensor;
- to determine at least one angular offset value between a direction corresponding to said information on the orientation of the head of the user and a longitudinal axis of the aircraft;
- to evaluate at least one condition as a function at least of said angular offset value; and
- to control the display on the display device in accordance with:
  - a first display mode when said condition is verified, this first display mode corresponding to a display comprising at least one aircraft piloting assistance symbol displayed in a conforming manner; and
  - another display mode when said condition is not verified, wherein:
- the angular offset value comprises a lateral angular offset and said condition includes at least one first elementary condition that is verified when the lateral angular offset is between a predetermined negative lateral angular offset threshold and a predetermined positive lateral angular offset threshold inclusive; and
- when the first elementary condition is not verified, the other display mode corresponds to a second display mode in which the at least one aircraft piloting assistance symbol is displayed in a non-conforming manner, wherein, in the first display mode, the display comprises at least part of an attitude scale and, if necessary, this attitude scale is expanded laterally as a function of the orientation of the head of the user in order to enable the display of said at least part of the attitude scale.

* * * * *